(12) United States Patent
Fujino

(10) Patent No.: US 7,199,822 B2
(45) Date of Patent: Apr. 3, 2007

(54) DYNAMIC WHITE BALANCE CONTROL CIRCUIT AND MULTI-SCREEN DISPLAY DEVICE

(75) Inventor: Shigeru Fujino, Tokyo (JP)

(73) Assignee: NEC Viewtechnology Ltd., Tokyo (JP)

( * ) Notice: Subject to any disclaimer, the term of this patent is extended or adjusted under 35 U.S.C. 154(b) by 385 days.

(21) Appl. No.: 10/640,328

(22) Filed: Aug. 14, 2003

(65) Prior Publication Data

US 2004/0032534 A1 Feb. 19, 2004

(30) Foreign Application Priority Data

Aug. 19, 2002 (JP) ............................. 2002-238109

(51) Int. Cl.
*H04N 9/73* (2006.01)

(52) U.S. Cl. .................................. 348/223.1; 348/655

(58) Field of Classification Search ............ 348/223.1, 348/224.1, 655, 656, 643; 358/515, 516
See application file for complete search history.

(56) References Cited

U.S. PATENT DOCUMENTS

| 3,457,362 | A | * | 7/1969 | Rychlewski et al. | ........ | 348/656 |
| 5,917,462 | A | * | 6/1999 | Suzuki et al. | .................. | 345/32 |
| 6,639,628 | B1 | * | 10/2003 | Lee et al. | ................ | 348/223.1 |
| 2002/0071041 | A1 | * | 6/2002 | Pine | ............................ | 348/222 |

FOREIGN PATENT DOCUMENTS

| EP | 0 475 320 | 3/1992 |
|----|-----------|--------|
| JP | 50-65126 | 6/1975 |
| JP | 60-89190 | 5/1985 |
| JP | 63-160492 | 7/1988 |
| JP | 64-39186 | 2/1989 |
| JP | 4-200174 | 7/1992 |
| JP | 5-211654 | 8/1993 |
| JP | 6-70345 | 3/1994 |
| JP | 6-178244 | 6/1994 |
| JP | 6-245224 | 9/1994 |
| JP | 7-23414 | 1/1995 |
| JP | 7-284120 | 10/1995 |
| JP | 9-281927 | 10/1997 |
| JP | 10-215382 | 8/1998 |
| JP | 11-205813 | 7/1999 |
| JP | 11-308450 | 11/1999 |
| JP | 11-355798 | 12/1999 |
| JP | 2000-92510 | 3/2000 |
| JP | 2001-169307 | 6/2001 |

* cited by examiner

*Primary Examiner*—Ngoc-Yen Vu
*Assistant Examiner*—Nicholas G Giles
(74) *Attorney, Agent, or Firm*—Young & Thompson

(57) ABSTRACT

A dynamic white balance control circuit is provided which is capable of dynamically setting a white balance and/or a color temperature according to a level of an input image signal. The dynamic white balance control circuit has a color component detecting circuit to detect a difference between a black and white image region and a colored image region in a video signal input to output a color component detected result, a selecting circuit to select and output a white balance setting value designating a different color temperature according to the color component detected result indicating the black and white image region or the colored image region, and a white balance control circuit to calibrate a white balance of a video image input according to a selected white balance setting value and to produce a video signal output.

6 Claims, 3 Drawing Sheets

DYNAMIC WHITE BALANCE CONTROL CIRCUIT AND MULTI-SCREEN DISPLAY DEVICE

BACKGROUND OF THE INVENTION

1. Field of the Invention

The present invention relates to a dynamic white balance control circuit and a multi-screen display device using the same, and more particularly to the dynamic white balance control circuit which can dynamically set a white balance and/or a color temperature of an image according to a signal level of an image signal and to a multi-screen display device using the dynamic white balance control circuit, and the multi-screen display device using the same.

The present application claims priority of Japanese Patent Application No. 2002-238109 filed on Aug. 19, 2002, which is hereby incorporated by reference.

2. Description of the Related Art

Conventionally, various technologies of a white balance control circuit adapted to calibrate a white balance and/or a color temperature of an image are known. As various kinds of conventional devices used to control the white balance control circuit for an image signal, there are provided an image data judging device to judge whether or not a dominant color exists on a screen by converting sampled image data to chromaticity signals and luminance signals and by counting the chromaticity signals in a limited region for processing, a color chart recognizing device to identify a color chart image by checking distribution of the chromaticity signals using a statistical amount calculating section, a light source presuming device to presume a light source by processing an iris calibrating mechanism control signal to judge whether or not light from an outside has been applied, and a like, as disclosed in, for example, Japanese Patent Application Laid-open No. Hei 6-70345 (here, this technology is called a "first conventional technology").

Moreover, in an image pickup device such as a video camera, electronic still camera, or a like, in order to improve accuracy that can be improved when a white region is small and to be able to calibrate a white balance even when a white region is large, an idea has been proposed. That is, after having divided an input image into a plurality of blocks using a block data detecting circuit, the image data is detected for every block. Then, a block being a white region is selected using a white region selecting circuit. If the number of blocks judged to have been a white region becomes large, by making small a width for judging convergence among color signals used to judge whether or not white balance calibration has converged using a white balance convergence judging width determining circuit and by detecting a level of each color signal using a white region image data detecting circuit, the white balance is calibrated using the white balance control circuit so that each color signal has a width indicating that the white balance calibration is judged to have converged, as disclosed in Japanese Patent Application Laid-open No. 2001-169307 (here, this technology is called a second conventional technology).

Also, in order to prevent a coloring phenomenon from occurring when a black and white image is input by making a white balance correction for an image display device, another idea has been proposed. That is, color image correction characteristic data obtained by a gamma correction and a white balance correction for every red, green, and blue image data is stored in advance in a memory section and a burst signal detecting section to detect a color burst signal from an original composite image signal is provided. Then, when the color burst signal is detected, a plurality of image converting sections each corresponding to each image data performs an input/output level conversion based on color image correction characteristic data. When the color burst signal is not detected, a control section exerts control on the memory section and on each of the image converting sections so that an input/output level conversion is performed based on predetermined color correction characteristic data selected from the color image correction characteristic data, as disclosed in, for example, Japanese Patent Application Laid-open No. Hei 11-205813 (here, this technology is called a third conventional technology).

Furthermore, in order to achieve gray scale and white balance calibration that can obtain a high hue and a high contrast in black display of an image, a correction data producing method for an image display device is known, which includes a step of storing chromaticity measured data, a step of storing luminance characteristic measured data, a step of setting and storing white display targeted chromaticity, a step of calculating a white display composite luminance ratio, a step of calculating corrected maximum luminance of each of red, green, and blue colors, a step of setting and storing black display targeted chromaticity, a step of calculating a black display composite luminance ratio, a step of calculating corrected minimum luminance of each of red, green, and blue colors from the black display composite luminance ratio and the luminance characteristic measured data, a step of producing a targeted luminance function from a gray level function representing a gray shade of luminance obtained after correction and from the corrected maximum luminance and corrected minimum luminance, a step of producing a luminance characteristic function from luminance characteristic measured data, and a step of calculating correction data from the targeted luminance function and luminance characteristic function, as disclosed in, for example, Japanese Patent Application Laid-open No. Hei 11-355798 (here, this technology is called a fourth conventional technology).

In the first conventional technology described above, the method is proposed in which the white balance control circuit in an image pickup device can calibrate the white balance irrespective of the size of the area in the white region in the screen. Moreover, in the second conventional technology, the method is proposed in which the white balance control circuit in the image pickup device can calibrate the white balance irrespective of influences caused by external light (from a light source). Also, in the third conventional technology, the method is proposed in which occurrence of coloring phenomenon can be prevented in the black and white image in which, at the time of inputting the black and white image, coloring occurs in the screen display depending on characteristics of the display device. Furthermore, in the fourth conventional technology, the method is proposed, in the image display device, a hue in black can be improved while a decrease in contrast can be suppressed.

However, such the conventional technologies have a problem. That is, in each of the conventional white balance control circuits, since a white balance and/or a color temperature are set by using, as a reference, a black and white image region in a screen, a tint (for example, a flesh color) of a colored image region in the screen becomes worse, or if the white balance and/or the color temperature are set by using as a reference, the colored image region, the color temperature becomes too low.

SUMMARY OF THE INVENTION

In view of the above, it is an object of the present invention to provide a white balance control circuit being capable of solving disadvantages in the above conventional technologies by dynamically setting a white balance and/or a color temperature according to a level of an image signal so that the white balance can be changed between a black and white image region and a colored image region on a screen and a multi-screen display device using the white balance control circuit.

According to a first aspect of the present invention, there is provided a dynamic white balance control circuit including:

a color component detecting circuit to detect whether of a black and white image region or a colored image region in an input video signal and to output a color component detected result;

a selecting circuit to select a white balance setting value designating a different color temperature according to the color component detected result indicating the black and white image region or the colored image region and to output the selected white balance setting value; and a white balance control circuit to calibrate a white balance of an input video signal according to the selected white balance setting value and to produce a video signal output.

In the foregoing, a preferable mode is one wherein the calibration of a white balance is performed in synchronization with a change in a video signal input.

Also, a preferable mode is one wherein the color component detected result indicating whether of the black and white image region or the colored image region is produced depending on whether or not a specified differential value among signal levels of red (R), green (G), and blue (B) colors in input video signal is smaller than a previously set value.

Also, a preferable mode is one wherein the white balance setting value for the black and white image region corresponds to a color temperature being 9300° (K).

Also, a preferable mode is one wherein the white balance setting value for the colored image region corresponds to a color temperature being 6500° (K).

According to a second aspect of the present invention, there is provided a multi-screen display device including:

a plurality of dynamic white balance control circuits to calibrate respectively a white balance of a different video signal input from each other, the dynamic white balance control circuits each including a color component detecting circuit to detect whether of a black and white image region or a colored image region in an input video signal and to output a color component detected result, a selecting circuit to select a white balance setting value designating a different color temperature according to the color component detected result indicating the black and white image region or the colored image region and to output the selected white balance setting value, and a white balance control circuit to calibrate a white balance of an input video signal according to the selected white balance setting value and to produce a video signal output; and a plurality of image display devices to project respectively an image in a different position from each other on a same screen based on a video signal output from corresponding the dynamic white balance control circuit, the image display device and the dynamic white balance control circuits being equal to each other in number.

With the above configurations, in the dynamic white balance control circuit of the present invention, since, at the time of setting a white balance and/or a color temperature of a video signal, according to results from detection of a signal level of an input video signal, the white balance and/or the color temperature can be dynamically set, a balance of a color in colored image regions can be calibrated irrespective of a tint of white in the black and white image regions and excellent color reproduction in the black and white image regions and the colored image region can be made possible.

With another configuration of the multi-screen device of the present invention, when configuring the multi-screen using a plurality of image display devices, since, by independently setting a white balance for the black and white image region and the colored image region, a balance of a color in the colored image region can be calibrated irrespective of a tint of white in the black and white image region, color matching among output images of each image display device can be achieved in a simple and easy manner.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
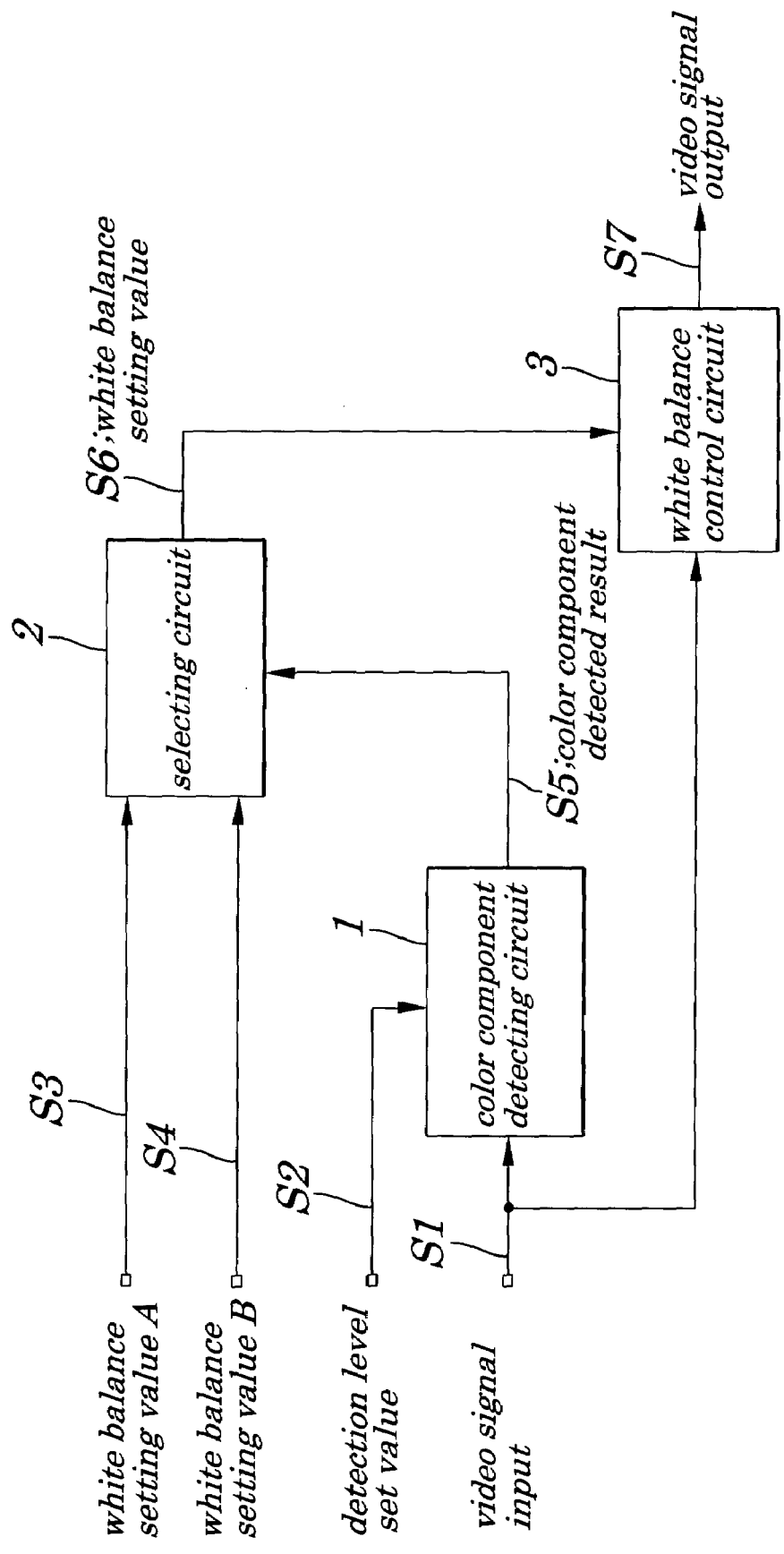
FIG. 1 is a schematic block diagram showing configurations of a dynamic white balance control circuit according to a first embodiment of the present invention.
Figure 2:
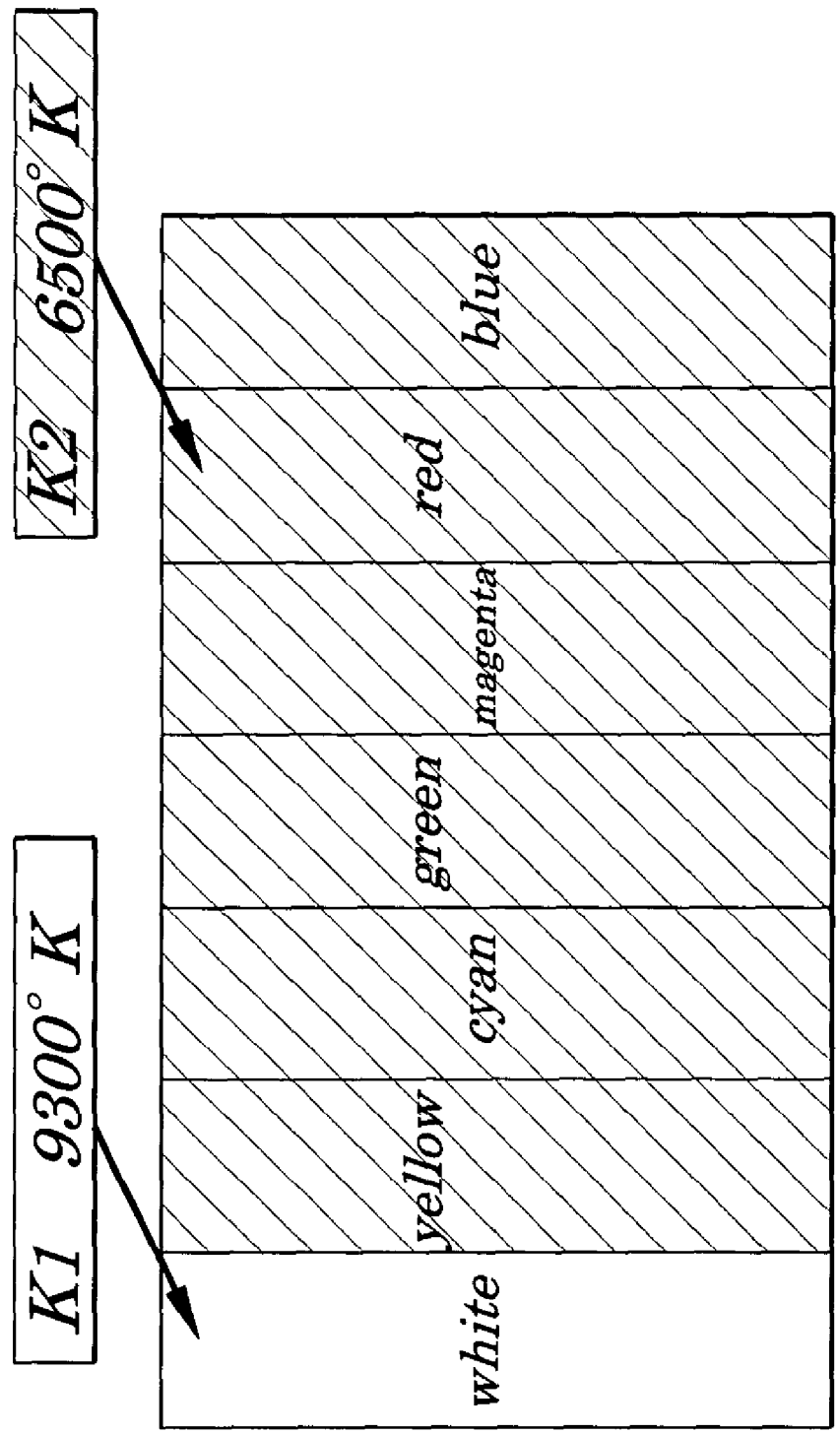
FIG. 2 is an image diagram showing a screen for setting a color temperature in the dynamic white balance control circuit of the first embodiment of the present invention.

FIG. 1 is a schematic block diagram showing configurations of a dynamic white balance control circuit 100 according to a first embodiment of the present invention. FIG. 2 is an image diagram showing a screen for setting a color temperature in the dynamic white balance control circuit 100 of the first embodiment. The dynamic white balance control circuit 100 of the first embodiment, as shown in FIG. 1, chiefly includes a color component detecting circuit 1, a selecting circuit 2, and a white balance control circuit 3.

The color component detecting circuit 1 compares a specified one of differential values among amplitude levels of red (R), green (G), and blue (B) color signals contained in video signals that have been input with a previously set value and produces a result of the detection of color components indicating a black and white image or a colored image. The selecting circuit 2, according to whether the result from the detection of color components performed by the color component detecting circuit 1 indicates the black and the white image or the colored image, selects a different white balance set value for outputting. The white balance control circuit 3, according to the white balance set value selected by the selecting circuit 2, calibrates the white balance in the video signal input to produce a video signal output.

Next, operations of the dynamic white balance control circuit 100 of the embodiment are described by referring to FIG. 1. The color component detecting circuit 1 in the dynamic white balance control circuit 100 of the embodiment shown in FIG. 1 detects each of differential values among signal levels of red (R), green (G), and blue (B)

colors contained in a video signal input S1 and judges whether the signal level of each of the colors is within a range that can be considered to be at an equal level or to be at a different level, depending on whether a difference between a maximum value from among obtained differential levels and a detection level set value S2 as a reference value is smaller or larger than a set value, and then outputs a color component detected result S5 indicating a black and white image or a colored image depending on a result from the judgement.

The selecting circuit 2, by adaptively performing processing of selecting a white balance setting value A (S3) corresponding to the black and white image when the color component detected result S5 indicates the black and white image and of selecting a white balance setting value B (S4) corresponding to the colored image when the color component detected result S5 indicates the colored image, outputs either of the white balance setting value A (S3) or the white balance setting value B (S4) as a white balance setting value S6. The white balance control circuit 3, by calibrating a white balance of the video signal input S1 based on the white balance setting value S6 fed from the selecting circuit 2, outputs a video signal output S7 obtained by calibrating the white balance and the color temperature.

For example, if the color component detected result S5 indicates existence of a black and white image region, the selecting circuit 2 selects the white balance setting value A (S3) corresponding to the black and white image, based on the selected white balance setting value A (S3), the white balance control circuit 3 calibrates a signal level of each of the R, G, and B colors in the video signal input S1 so that a white balance and/or a color temperature of a video signal being suitable to the black and white image can be obtained and produces the video signal output S7. Also, if the color component detected result S5 indicates existence of a colored image region, the selecting circuit 2 selects the white balance setting value B (S4) corresponding to the colored image, and based on the selected white balance setting value B (S4), the white balance control circuit 3 calibrates a signal level of each of the R, G, and B colors in the video signal input S1 so that a white balance and/or a color temperature of a video signal being suitable to the colored image can be obtained and produces the video signal output S7. In the dynamic white balance control circuit 100 of the embodiment, setting of such the white balance and/or color temperature in a video signal output can be performed in synchronization with a change in the input video signal.

One concrete example of setting a color temperature in the dynamic white balance control circuit 100 of the embodiment is described by referring to FIG. 2. FIG. 2 shows a full field color bar image in a color temperature setting screen image, in which a portion K2 represented by sloped lines shows a colored portion and a portion K1 not represented by sloped lines is a colorless black and white portion. In the dynamic white balance control circuit 100 of the embodiment shown in FIG. 1, existence or absence of a color is detected based on a signal level and, according to results from the detection, setting is made independently and adaptively so that a color temperature becomes, for example, 9300° (K) in the black and white image region K1 and the color temperature becomes, for example, 6500° (K) in the colored image region K2 represented by the sloped lines.

This is because, in the case of the black and white image, since bluish white is generally preferred, it is desirous that the black and white image region has bluish white by raising a color temperature and, in the case of the colored image, since higher color temperature as a whole causes gradations in color to become unnatural and causes incorrect expression of a flesh color, the color temperature has to be lowered. Therefore, by making such the independent and adaptive setting of two types, calibration can be performed to achieve excellent color reproduction in both the colorless and colored image regions.

Thus, according to the dynamic white balance control circuit 100 of the embodiment, since independent setting for each of the black and white image region and the colored image region is made possible, a balance in each of R, G, and B colors in the colored image region can be calibrated irrespective of a tint of white in the black and white image region and therefore excellent color reproduction can be achieved in each of the black and white image region and the colored image region.

Second Embodiment

Figure 3:
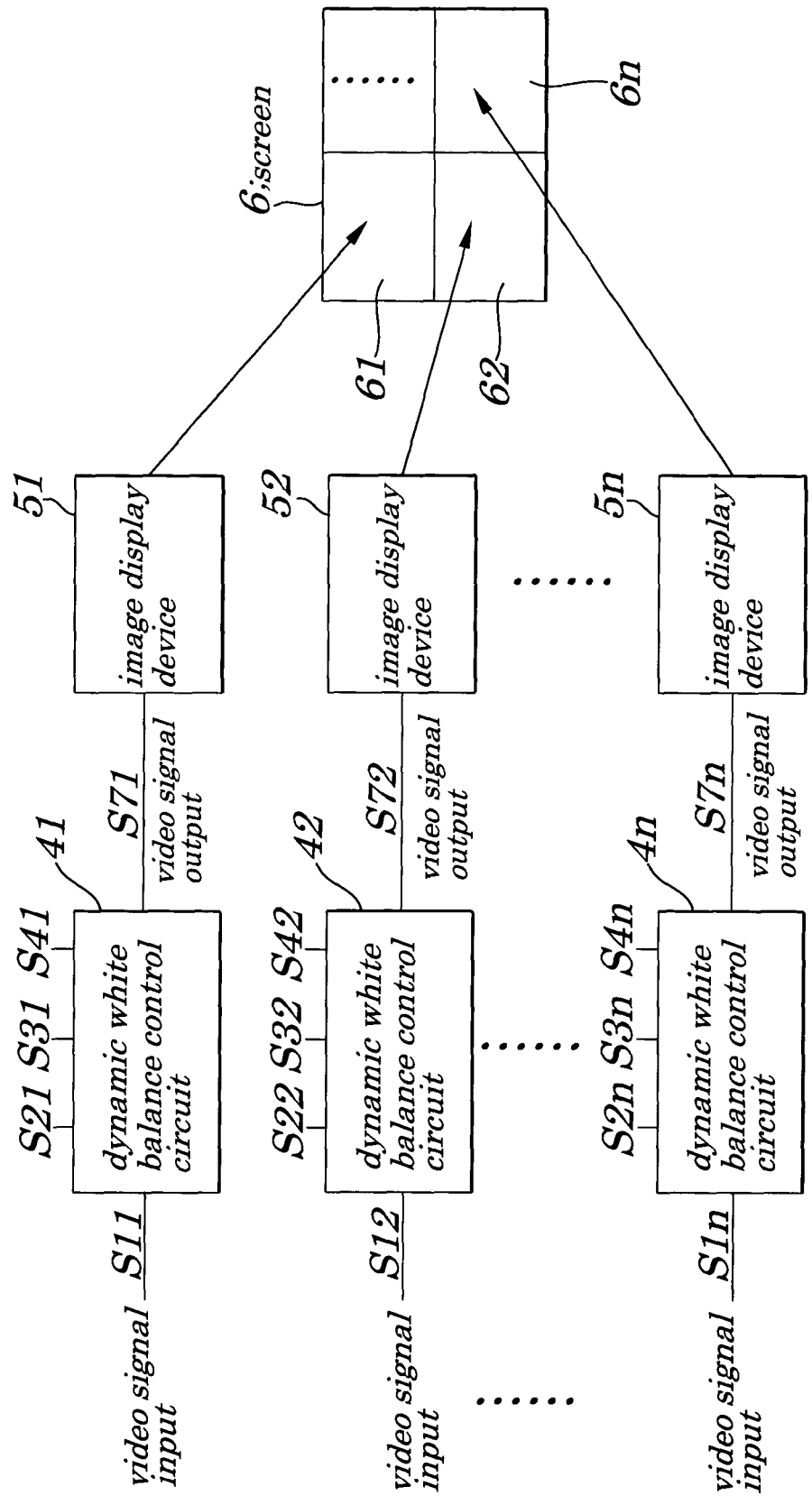
FIG. 3 is a schematic block diagram showing configurations of a multi-screen display device according to a second embodiment of the present invention.

FIG. 3 is a schematic block diagram showing configurations of a multi-screen display device 200 configured by a plurality of image display devices according to a second embodiment of the present invention. The multi-screen display device 200 of the second embodiment, as shown in FIG. 3, is made up of dynamic white balance control circuits 41, 42, . . . , 4n, image display devices (projector) 51, 52, . . . , 5n, and a screen 6.

Each of the dynamic white balance control circuits 41, 42, . . . , 4n has the configurations shown in FIG. 1 and has a function of dynamically performing calibration of a different white balance on a black and white image region and on a colored image. Each of the image display devices 51, 52, . . . , 5n displays a video consisting of multi-screens by projecting video signal outputs fed from the dynamic white balance control circuits 41, 42, . . . , 4n in different positions on a same screen 6.

Operations of the multi-screen display device 200 of the second embodiment are described by referring to FIG. 3. Each of "n" (n being natural number) pieces of the dynamic white balance control circuits 41, 42, . . . , 4n performs detection of color components on each of video signal inputs S11, S12, . . . , S1n by using detection level set values S21, S22, . . . , S2n and outputs video signal outputs S71, S72, . . . , S7n by selecting, according to results from the color component detection in the case of a black and white image, white balance setting values S31, S32, . . . , S3n and by selecting white balance set values S41, S42, . . . , S4n and then by performing calibration of white balances on video signal inputs S11, S12, . . . , S1n.

Each of the image display devices 41, 42, . . . , 4n produces video outputs consisting of optical light by using the video signals S71, S72, . . . , S7n and projects them onto the screen 6. At this point, each image projected by the image display devices 41, 42, . . . , 4n occupies one of different positions 61, 62, . . . , 6n on the screen 6 and each image projected on the screen 6 makes up one multi-screen.

Thus, according to the multi-screen display device 200 of the embodiment, since, by independently setting a white balance for each of a colored image region and a black and white image region for every screen making up the multi-screen, a balance of a color in the colored image region can be calibrated irrespective of a tint in white in the black and white image region, color matching can be achieved in a simple and easy manner among output images of each image display device in configuring a multi-screen by a plurality of images.

It is apparent that the present invention is not limited to the above embodiments but may be changed and modified without departing from the scope and spirit of the invention. For example, the color temperature of being 9300° (K) for the black and white image region K1 and the color temperature being 6500° (K) for the colored image region K2 shown in FIG. 2 is one example and other temperatures can be set for both the black and white image region K1 and the colored image region K2. Moreover, the multi-screen display device 200 shown in the second embodiment may be configured so that, instead of using a plurality of image display devices to display a multi-screen, for example, by using a multi-screen composite device (not shown) and employing video signal outputs fed from a plurality of the dynamic white balance control circuit, by producing a video signal that can produce one multi-screen, by projecting the produced video signal on the screen using one image display device or by displaying the produced video signal on one display device, an image consisting of the multi-screen is displayed.

What is claimed is:

1. A dynamic white balance control circuit comprising:
    a color component detecting means having a video signal input, a detection level set value input, and a color component detected result output, the color component detecting means comparing a specified one of differential values among amplitude levels of red, green, and blue input video signals with a previously set value to produce a color component detection result indicating i) a black and white image region when the image region is a black and white image region and indicating ii) a colored image region when the image region is a colored image region;
    a selecting means having a first white balance setting value input, a second white balance setting value input, an input corresponding to the color component detected result output, and a white balance setting value output, the selecting means to select, based on the produced color component detection result, a white balance setting value designating a first color temperature according to the color component detection result indicating the black and white image region and designating a second color temperature according to the color component detection result indicating the colored image region and to output the selected white balance setting value; and
    a white balance control means with an input corresponding to the white balance setting value output and to the video signal input, the white balance control means to calibrate a white balance of the input video signal according to the selected white balance setting value and to produce a video signal output,
    wherein the color component detecting means detects each of the differential values among the signal amplitude levels of the red, green and blue colors contained in the input video signal and judges whether the signal amplitude level of each of the red, green, and blue colors is within a range at an equal level or at a different level, depending on whether a difference between i) a maximum value from among obtained differential levels and ii) a detection level set value sensed at the detection level set value input is smaller or larger than a set value, and then outputs the color component detected result indicating i) the black and white image region or ii) the colored image region depending on a result from the judgment.

2. The dynamic white balance control circuit according to claim 1, wherein the calibration of the white balance is performed in synchronization with a change in the input video signal.

3. The dynamic white balance control circuit according to claim 1, wherein the white balance setting value for the black and white image region corresponds to a color temperature being 9300° (K).

4. The dynamic white balance control circuit according to claim 1, wherein the white balance setting value for the colored image region corresponds to a color temperature being 6500° (K).

5. A dynamic white balance control circuit comprising:
    a color component detecting means having a video signal input, a detection level set value input, and a color component detected result output, the color component detecting means comparing a specified one of differential values among amplitude levels of red, green, and blue input video signals with a previously set value to produce a color component detection result indicating i) a black and white image region when the image region is a black and white image region and indicating ii) a colored image region when the image region is a colored image region;
    a selecting means having a first white balance setting value input, a second white balance setting value input, an input corresponding to the color component detected result output, and a white balance setting value output, the selecting means to select, based on the produced color component detection result, a white balance setting value designating a first color temperature according to the color component detection result indicating the black and white image region and designating a second color temperature according to the color component detection result indicating the colored image region and to output the selected white balance setting value; and
    a white balance control means with an input corresponding to the white balance setting value output and to the video signal input, the white balance control means to calibrate a white balance of the input video signal according to the selected white balance setting value and to produce a video signal output, wherein,
    the color component detecting means detects each of the differential values among the signal amplitude levels of the red, green and blue colors contained in the input video signal and judges whether the signal amplitude level of each of the red, green, and blue colors is within a range at an equal level or at a different level, depending on whether a difference between i) a maximum value from among obtained differential levels and ii) a detection level set value sensed at the detection level set value input is smaller or larger than a set value, and then outputs the color component detected result indicating i) the black and white image region or ii) the colored image region depending on a result from the judgment, and
    the color component detecting means judges a first region of a screen image to be the black and white image region and a second region of the screen image to be the colored image region and, responsively, the white balance control means calibrates the white balance to a first color temperature value for the first region of the screen image and to a second color temperature value for the second region of the screen image.

6. The dynamic white balance control circuit according to claim 5, wherein, the first color temperature value is 9300° (K) in the black and white image region and the second color temperature value is 6500° (K) in the colored image region.

* * * * *